(12) United States Patent
Bar-on

(10) Patent No.: US 10,555,136 B1
(45) Date of Patent: Feb. 4, 2020

(54) SOFT PREEMPTION FOR A PUSH-TO-TALK GROUP

(71) Applicant: MOTOROLA SOLUTIONS, INC., Chicago, IL (US)

(72) Inventor: David Bar-on, Rehovot (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/173,345

(22) Filed: Oct. 29, 2018

(51) Int. Cl.
*H04W 4/10* (2009.01)
*H04W 76/45* (2018.01)
*H04L 5/16* (2006.01)
*H04W 76/27* (2018.01)
*H04W 84/08* (2009.01)

(52) U.S. Cl.
CPC ............. *H04W 4/10* (2013.01); *H04L 5/16* (2013.01); *H04W 76/27* (2018.02); *H04W 76/45* (2018.02); *H04W 84/08* (2013.01)

(58) Field of Classification Search
CPC .......... H04W 4/10; H04W 76/45; H04W 4/08
See application file for complete search history.

(56) References Cited

U.S. PATENT DOCUMENTS

| 5,473,605 | A | 12/1995 | Grube et al. |
| 7,062,286 | B2 | 6/2006 | Grivas et al. |
| 8,565,802 | B2 | 10/2013 | Mistro |
| 2006/0229093 | A1 | 10/2006 | Bhutiani et al. |
| 2007/0104121 | A1* | 5/2007 | Shaffer ............... H04L 65/4061 370/276 |
| 2015/0009865 | A1* | 1/2015 | Sharma .................... H04L 5/16 370/277 |

* cited by examiner

*Primary Examiner* — Keith Ferguson
(74) *Attorney, Agent, or Firm* — Michael Best & Friedrich LLP

(57) ABSTRACT

Methods and systems for managing a radio communication group call. One system includes a call controller configured to be communicatively coupled to a first communication device, a second communication device and a third communication device. The call controller includes an electronic processor configured to establish a half-duplex group call between the first communication device, the second communication device, and the third communication device. The processor receives, from the second communication device, an audio signal and receives, from the first communication device, a soft preemption talk request. The electronic processor establishes, in response to receiving the soft preemption talk request, a full-duplex private call between the first communication device and the second communication device and transmits audio of the full-duplex private call to the third communication device.

20 Claims, 5 Drawing Sheets

SOFT PREEMPTION FOR A PUSH-TO-TALK GROUP

BACKGROUND OF THE INVENTION

Some communication devices, such as mobile telephones and two-way radios, provide push-to-talk functionality. Push-to-talk (PTT) is a method of transmitting audio communications over a half-duplex communication channel. PTT is a common way of performing public safety communications (e.g., communications between police officers, first responders, and the like).

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
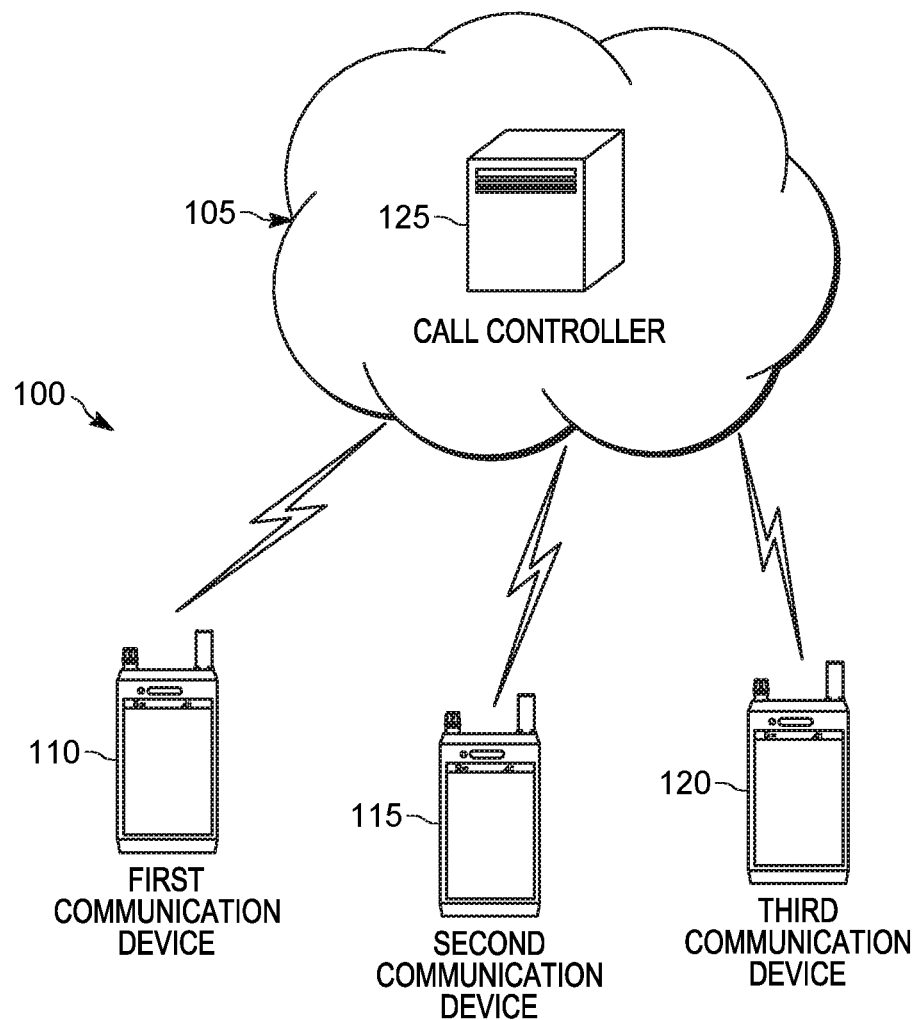
FIG. 1 is a diagram of a communications system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As mentioned above, PTT communications provide communications between communication devices. Public safety personnel (for example, police officers, emergency personnel, first responders, and the like) use PTT communications when responding to an incident.

In some communication networks, for example, land mobile radio (LMR) and trunked radio networks, PTT communications are used in talk groups. A talk group is a group of communication devices, created by an administrator, in which each communication device in the talk group may participate in a group call. Group calls may be initiated and managed, for example, at a call controller, a call center, a control head, or a server. A PTT group call is half-duplex meaning, as explained below, audio from a single communication device is shared at a time.

PTT communications are initiated by a user by activating a designated PTT mechanism (for example, a PTT "hard" or "soft" button) on the user's communication device. A talk request is transmitted to the call controller and, in response, the call controller grants the communication device the "floor," meaning only the audio received by the communication device is shared, via the call controller, with the other communication devices of the group participating in the group call. The user maintains the PTT mechanism in the activated position or state for as long as they want the communication "floor" (actively share audio). Received audio is muted for the communication device that has the communication floor (herein referred to as the PTT floor). The user may forfeit the PTT floor by releasing the PTT mechanism. While the PTT floor is available, a new user may request the floor by activating the PTT mechanisms on his or her communication device.

In addition to group calls, PTT communications can also be used in a private call. As the name implies, private PTT calls involve one-to-one communications. Private PTT calls may be implemented in either full-duplex or half-duplex.

During a PTT group call, a user may want to speak to the group while another user has the PTT floor. The call controller may implement a hard preemption of the user who currently has the PTT floor. A hard preemption causes the user who currently has the PTT floor (the talker) to forfeit the floor to the other user who made the preemption request (the preemptor). In some circumstances, it may be desirable to allow the talker who originally had the floor to continue speaking while also allowing the preemptor to speak as well (in other words, a full-duplex call between the talker and preemptor) while still muting the other participants. In other words, it may be desirable utilize a "soft preemption" method that allows both the talker and the preemptor to speak in parallel in the group call. Accordingly, embodiments described herein provide methods for soft preemption in PTT group communications.

One example embodiment provides a radio communications system that includes a call controller configured to be communicatively coupled to a first communication device, a second communication device, and a third communication device. The call controller includes an electronic processor configured to establish a half-duplex group call between the first communication device, the second communication device, and the third communication device. The processor receives, from the second communication device, an audio signal and receives, from the first communication device, a soft preemption talk request. The electronic processor establishes, in response to receiving the soft preemption talk request, a full-duplex private call between the first communication device and the second communication device and transmits audio of the full-duplex private call to the third communication device.

Another example embodiment provides a communication device communicatively coupled to a second communication device and a third communication device. The communication device includes an electronic processor configured to receive an audio signal from the second communication device of a half-duplex group call between the communication device, the second communication device, and the third communication device, receive, via a user interface, a user preemption request, and transmit, in response to receiving the user preemption request, a soft preemption talk request. The communication device is further configured to join a full-duplex private call provided by a call controller, with the second communication device and transmit audio of the full-duplex private call to the third communication device.

Another example embodiment provides a method of managing a radio communication group call. The method includes establishing a half-duplex group call between a first communication device, a second communication device, and a third communication device, receiving, from the second communication device, an audio signal, and receiving, from the first communication device, a soft preemption talk request. The method further includes establishing, in response to receiving the soft preemption talk request, a full-duplex private call between the first communication device and the second communication device and transmitting audio of the full-duplex private call to the third communication device.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 illustrates an example communications system 100. The communications system 100 includes a communication network 105, a first communication device 110, a second communication device 115, and a third communication device 120. The communication network 105 is configured to provide communications between the first communication device 110, the second communication device 115, and the third communication device 120.

The network 105 is a communications network and may include wireless and wired portions configured to support PTT communications. The network 105 may be, for example, a land mobile radio (LMR) network. In some embodiments, the network 105 may, for example, be implemented in accordance with Project 25 (P 25) or other communications protocols. In some embodiments, the network 105 includes or is alternatively implemented using a wide area network, for example, the Internet, a local area network, for example, a Bluetooth™ network or Wi-Fi, a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, and combinations or derivatives thereof. It should be understood that FIG. 1 depicts the network 105 in a simplified manner, and an actual implementation may include additional components to support other features. For example, the network 105 may include one or more basestations, repeaters, or both.

The network 105 includes a call controller 125. The call controller 125 is communicatively coupled to each of the communication devices 110, 115, and 120. The call controller 125 is configured to manage communication among the communication devices 110, 115, and 120. In some embodiments, network 105 includes hardware, software, or a combination of both configured to assign the first communication device 110, the second communication device 115, the third communication device 120, other communication devices (not shown), or combinations thereof to one or more talk groups and to facilitate communications therebetween. For example, the call controller 125 may, upon receiving a request from one of the communication devices, establish PTT channels between two or more communication devices based on call type (whether a group call, a half-duplex private call, or a full-duplex private call), talk group identifiers, device identifiers, or a combination thereof.

The first communication device 110, the second communication device 115, and the third communication device 120 transmit and receive voice and data to each other and to other communication devices (not shown) via signals transmitted to and from the network 105 (in particular, the call controller 125). The communication devices 110, 115, and 120 may each be any type of communication device capable of communicating over the network 105. In some embodiments, one or more of the communication devices 110, 115, and 120 may be different types of communication devices. The communication devices 110, 115, and 120 may be, for example, hand-held radios, vehicle-mounted radios, dispatch radios, or other wireless communication devices compatible with the protocol of the communication network 105.

It should be noted that while FIG. 1 illustrates one configuration of an embodiment of a communications system 100, in other embodiments, the communications system 100, or its components thereof, may have a different configuration. In some embodiments, there may be more or less communication devices communicatively coupled to the network 105 than are illustrated in FIG. 1. In addition, as described below, in some embodiments, the call controller 125 may be integrated into one or more of the communication devices 110, 115, and 120.

Figure 2:
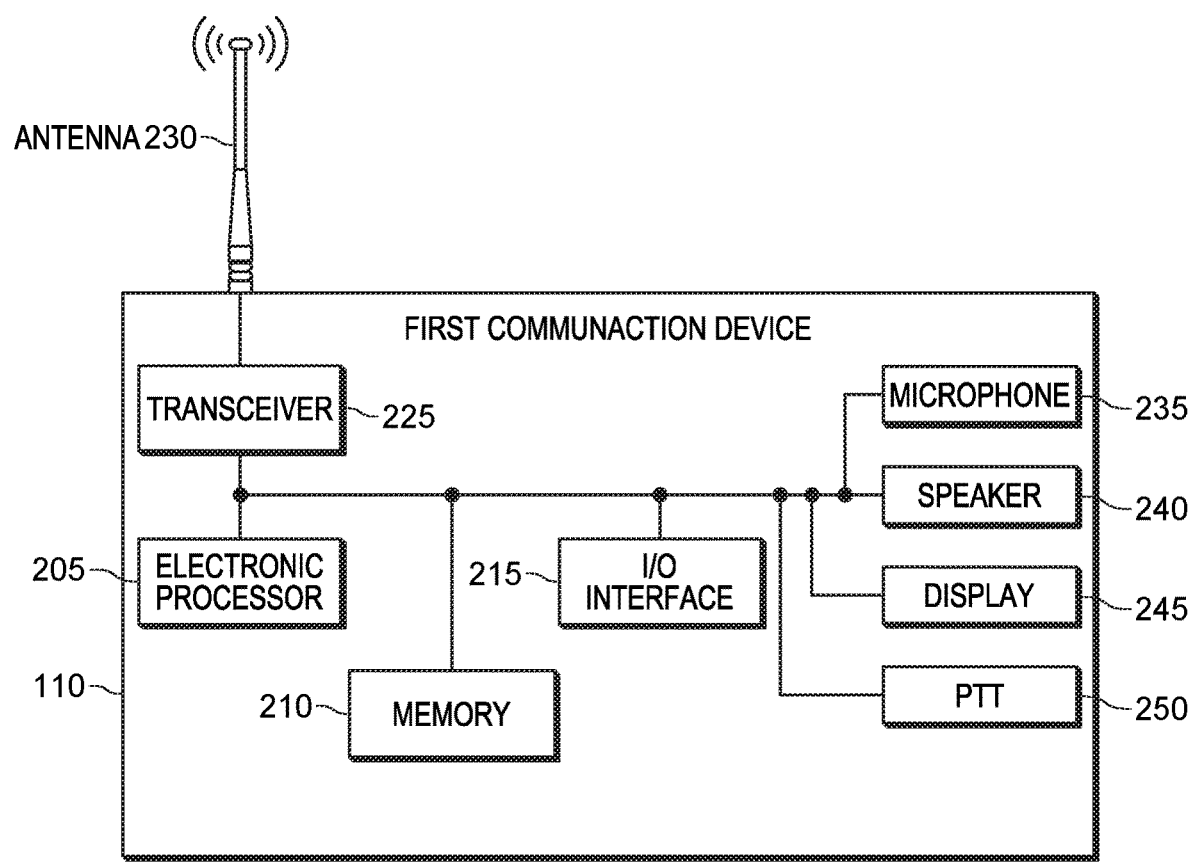
FIG. 2 is a diagram of a communication device included in the communications system of FIG. 1 in accordance with some embodiments.

FIG. 2 is a diagram of the first communication device 110. In the embodiment illustrated, the communication device 110 includes an electronic processor 205, a memory 210, an input/output interface 215, a transceiver 225, an antenna 230, microphone 235, a loudspeaker 240, and a PTT selection mechanism 250. In some embodiments, the communication device 110 may additionally include a display 245.

The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein. In some embodiments, the communication device 110 includes fewer or additional components in configurations different from that illustrated in FIG. 2. For example, in some embodiments, the communication device 110 includes multiple microphones, multiple speakers, or combinations thereof.

The electronic processor 205 obtains and provides information (for example, from the memory 210 and/or the input/output interface 215), and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the control processes and methods described herein. The memory 210 can include one or more non-transitory computer-readable media, and includes a program storage area and a data storage area. The program storage area and the data storage area can include combinations of different types of memory, as described herein.

The input/output interface 215 is configured to receive input and to provide system output. The input/output interface 215 obtains information and signals from, and provides information and signals to, (for example, over one or more wired and/or wireless connections) devices both internal and external to the second communication device 110.

The electronic processor 205 is configured to control the transceiver 225 to transmit and receive audio and other data to and from the communication device 110. The transceiver 225 transmits and receives radio signals to and from, for example, the network 105 using the antenna 230. The electronic processor 205 and the transceiver 225 may include various digital and analog components, which for brevity are not described herein and which may be implemented in hardware, software, or a combination of both. Some embodiments the transceiver 225 includes separate transmitting and receiving components, for example, a transmitter and a receiver, instead of a combined transceiver.

The microphone 235 is a transducer capable of sensing sound, converting the sound to electrical signals, and transmitting the electrical signals to the electronic processor 205. The electronic processor 205 processes the electrical signals received from the microphone 235 to produce an audio stream, which may be transmitted to other devices via the transceiver 225. The loudspeaker 240 is a transducer for reproducing sound from electrical signals (for example, generated from a received audio stream) received from the electronic processor 205. In some embodiments, the microphone 235, the loudspeaker 240, or both may be integrated in a single housing with the other components (for example, in a portable hand-held radio). In some embodiments, the microphone 235, the loudspeaker 240, or both are present in an accessory device (for example, a remote speaker microphone (RSM)) connected via a wired or wireless connection to the communication device 110.

The display 245 is a suitable display, for example, a liquid crystal display (LCD) touch screen, or an organic light-emitting diode (OLED) touch screen. In some embodiments, the communication device 110 implements a graphical user interface (GUI) (for example, generated by the electronic processor 205, from instructions and data stored in the memory 210, and presented on the display 245), that enables a user to interact with the communication device 110.

The PTT selection mechanism 250 allows a user of the communication device 110 to initiate PTT voice communications to one or more other communication devices, either directly or over the network 105. For example, when the electronic processor 205 detects that the PTT selection mechanism 250 is enabled, the electronic processor 205 controls the transceiver 225 to transmit signals created by sound detected by the microphone 235 (for example, as a half-duplex communication signal). When the electronic processor 205 detects that the PTT selection mechanism 250 is no longer enabled (for example, has been released), the transceiver 225 stops transmitting the signals. In some embodiments, the PTT selection mechanism 250 is a mechanical button, key, switch, or knob. In some embodiments, the PTT selection mechanism 250 is provided as part of a graphical user interface (for example, a virtual button) presented on the display 245. The second and third communication devices 115 and 120 may be configured in a manner that is similar to the way in which the first communication device 110 is configured.

Figure 3:
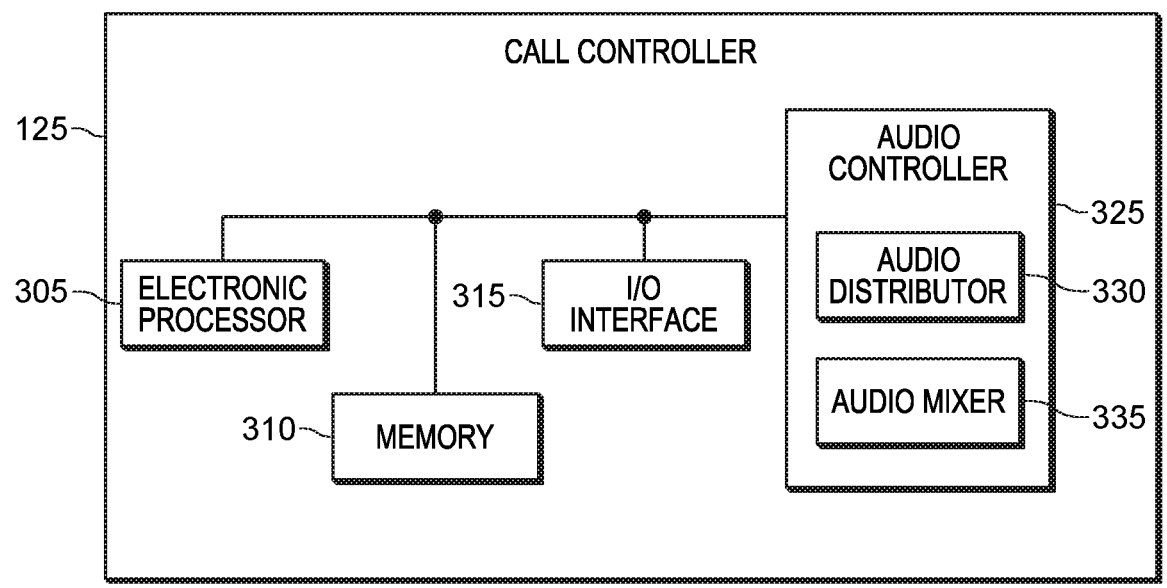
FIG. 3 is a diagram illustrating the call controller of the communications system of FIG. 1 in accordance with some embodiments.

FIG. 3 is a block diagram of the call controller 125 in accordance with some embodiments. The call controller 125 may include, among other things, a call controller electronic processor 305, a call controller memory 310, and an input/output (I/O) interface 315. In the illustrated embodiment, the call controller 125 also includes an audio controller 325. FIG. 3 depicts the call controller 125 in a simplified manner, and an actual implementation may include additional components to other features. In some embodiments, the call controller 125 includes fewer or additional components in configurations different from that illustrated in FIG. 3. In some embodiments, the components of the call controller 125 are dispersed over several electronic devices external to the call controller 125. For example, the audio controller 325 may be implemented as a device separate from the call controller 125. For example, the audio controller 325 may be a standalone server. In some embodiments, some or all of the components and functionality thereof of the call controller 125 are integrated into a communication device of the system 100. For example, the call controller 125 may be integrated into one or more of the communication devices 110, 115, and 120. In other embodiments, some or all of the components of the call controller 125 may be implemented virtually (for example, the memory 310 may be implemented as a cloud-based storage).

The components of the call controller 125 are communicatively coupled to another via one or more buses or other wired or wireless connections. The call controller electronic processor 315 is a hardware device, such as a microprocessor, for executing software instructions including the method 400 of FIG. 4 described in more detail below. The call controller memory 310 includes, for example, a program storage area and a data storage area. The call controller electronic processor 315 executes software instructions that are capable of being stored in random access memory (RAM) of the call controller memory 310 (e.g., during execution), read-only memory (ROM) of the call controller memory 310 (e.g., on a generally permanent basis), or another non-transitory computer readable medium. The software may include, one or more applications, program data, filters, rules, one or more program modules, and other executable instructions.

The input/output (I/O) interface 315 may provide wired and/or wireless communication between the call controller 125 and external devices, for example, the communication devices 110, 115, and 120, as well as other communication devices. For example, the I/O interface 315 may include an antenna and transceiver configured similarly to the antenna 230 and transceiver 225 described above.

In the illustrated embodiment, the call controller includes an audio controller 325. The audio controller 325 is configured to process audio signals received, via the I/O interface 315, from the communication devices (for example, communication devices 110, 115, and 120) communicatively coupled to the network 105. In the illustrated embodiment, the audio controller 325 includes an audio distributor 330 and an audio mixer 335. The audio mixer 335 is configured to combine and process audio signals received from one or more of the communication devices 110, 115, and 120. The audio distributor 330 is configured to distribute the processed audio signals to one or more communication devices within the PTT call.

Figure 4:
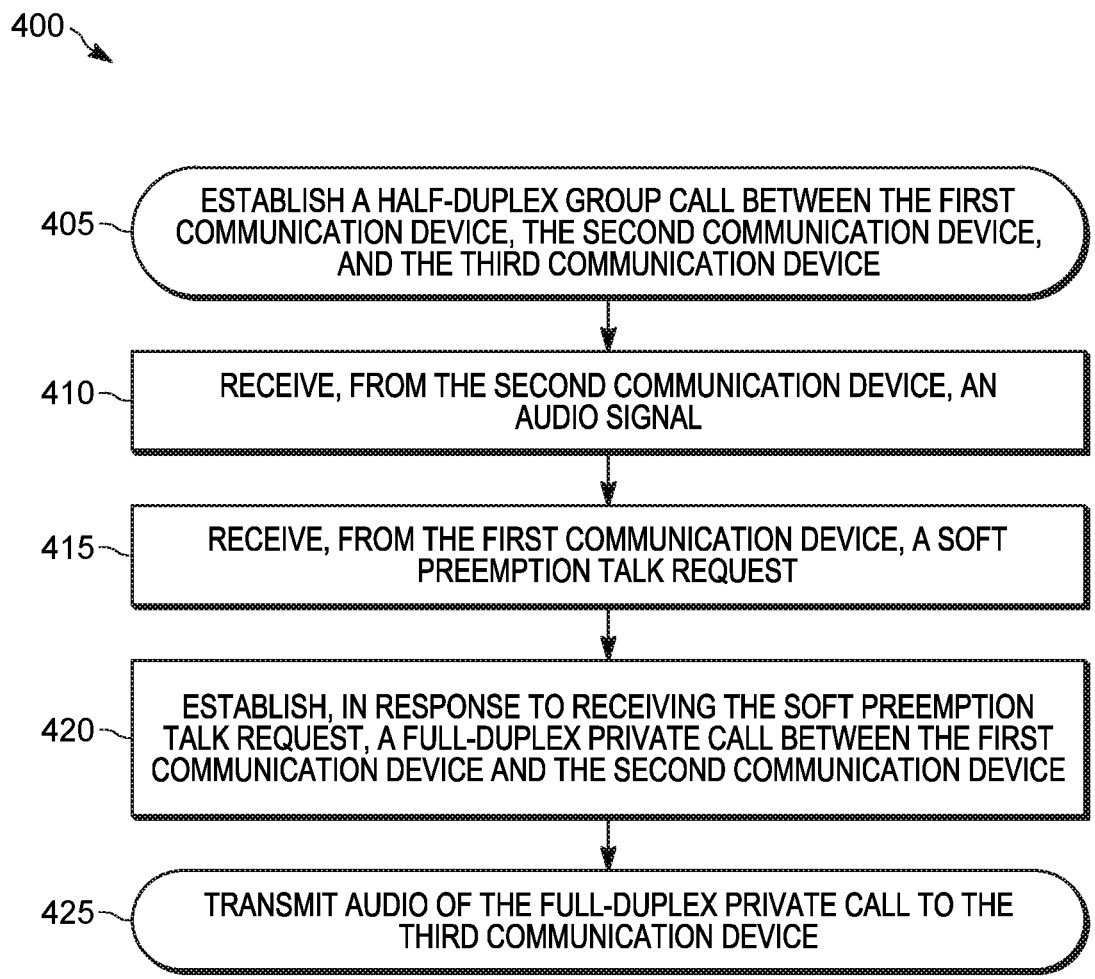
FIG. 4 is a flowchart of a method for managing a radio communication group call between the communication devices of the communications system of FIG. 1 in accordance with some embodiments.

FIG. 4 is a flowchart illustrating a method or procedure 400 for managing a radio communication group call between the communication devices 110, 115, and 120 in accordance to some embodiments. As an example, the method 400 is explained in terms of the call controller 125, in particular the electronic processor 305. However, it should be understood that portions of the method 400 may be distributed among multiple devices (for example, between the call controller 125 and one or more of the communication device 110, 115, and 120). It should also be understood that, while the method 400 is described in regard to the first communication device 110, the second communication device 115, and the third communication device 120, in some embodiments, the method 400 may be applied to additional communication devices.

At block 405, the electronic processor 305 establishes a half-duplex (PTT) group call including the first communication device 110, the second communication device 115, and the third communication device 120. As mentioned above, in a half-duplex call, audio from a single communication device is received at a central call controller (for example, the call controller 125) and redistributed to the other communication devices included in the call. It should be understood that, while in the present example, the half-duplex group call is between the first communication device 110, the second communication device 115, and the third communication device 120, that the group call may be between a different number of communication devices.

At block 410, the electronic processor 305 receives, from the second communication device 115, an audio signal. As described above, the audio signal is an audio signal created by sound detected by the microphone of the communication device while the PTT selection mechanism of the communication device is enabled. At block 415, the electronic processor 305 receives, from the first communication device 110, a soft preemption talk request. The soft preemption talk request is an instruction made by a communications device indicating that an operator of the communications device wants to transmit audio to the other communication devices of the half-duplex group call without interrupting or over-riding the audio currently being shared with the group (in other words, engage in a full-duplex call with the communication device that has the PTT floor).

The soft preemption talk request may be transmitted by the first communication device 110 in response to receiving a particular user input (for example, via a particular user-actuated device provided on the communication device, a predetermined actuation pattern of the PTT selection mechanism 250, and the like). In some embodiments, the soft preemption talk request is transmitted automatically in response to the first communication device 110 detecting that the PTT selection mechanism is enabled while another device is transmitting audio to the group. As explained in more detail below in regard to FIG. 5, the soft preemption talk request may be a set preemption flag within a talk request transmitted to the call controller 125.

In some embodiments, two or more of the communication devices of the half-duplex group call are associated with a priority level. The priority levels may be associated with roles. For example, the first communication device 110 may be associated with a police chief (a high priority), the second communication device 115 may be associated with a com-manding officer (a medium priority), and the third communication device 120 (and other communication devices of the talk group) may be associated with a responding officer (a low priority). In such embodiments, the call controller 125 is further configured to determine the priority level associated with the communication device that transmitted the soft preemption talk request and either grant or decline the request based on the priority level. For example, the call controller 125 may grant the soft preemption talk request when a user currently associated with the first communication device 110 is of a priority common or equal to a priority level of the second communication device 115. In some embodiments, the call controller 125 grants the soft preemption talk request when the priority level of the second communication device 115 is greater than the priority level associated with one or more of the other communication devices in the half-duplex group call while the priority level associated with the first communication device 110 is greater than that of the second communication device 115.

At block 420, the electronic processor 305 establishes, in response to receiving the soft preemption talk request, a full-duplex private call between the first communication device 110 and the second communication device 115. As explained in more detail below in regard to FIG. 5, the audio of the full-duplex private call between the first communication device 110 and the second communication device 115 is, at block 425, transmitted to the third communication device 120. For example, the electronic processor 305 may be configured to remove the third communication device 120 from the half-duplex group call and add the third communication device 120 to a new half-duplex group call where, as explained below in regard to FIG. 5, the audio of the full-duplex private call has the PTT floor. The electronic processor 305 may also transmit the audio of the full-duplex private call to one or more other communication devices (for example, other communication devices included in the half-duplex group call of block 405).

As explained in more detail below in regard to FIG. 5, the electronic processor 305 is further configured to return the first communication device 110 and the second communication device 115 to the half-duplex group call upon ending the full-duplex private call. The electronic processor 305 may end the call in response to receiving an end (private) call request from either or both communication devices 110 and 115. In some embodiments, the electronic processor 305 ends the full-duplex private call in response to detecting no audio (in other words, neither user of the communication devices 110 and 115 respectively are speaking) or no actuation of the PTT selection mechanism for a predetermined amount of time. For example, an end call request may be sent by either or both communication devices 110 and 115, when a user releases the PTT mechanism of the communication device. In some embodiments, when one of the communication devices ends the private call, the call controller may grant the group call floor to the other communication device, so the user of the other communication device can continue to talk.

Figure 5:
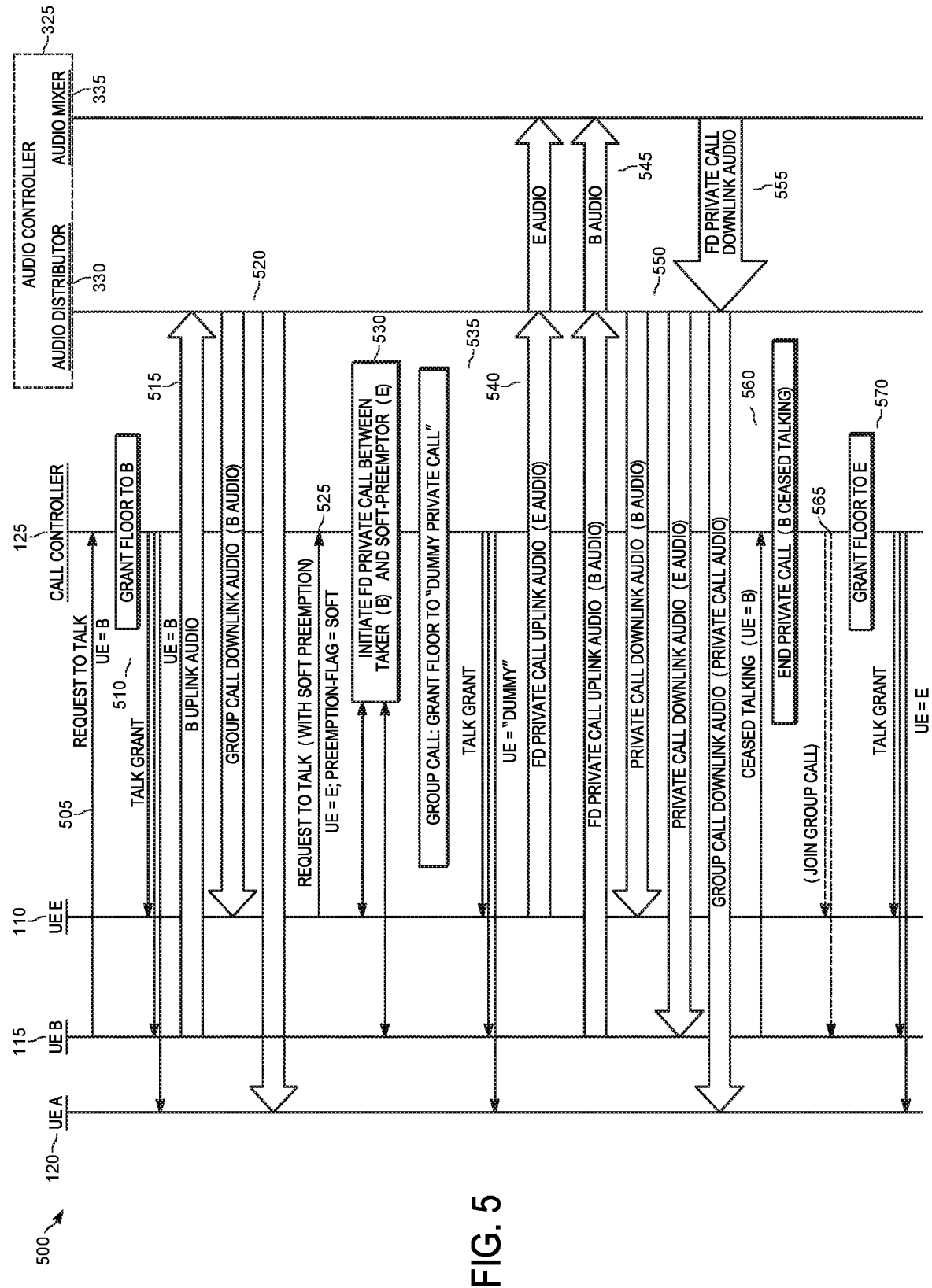
FIG. 5 is a message flow diagram illustrating the method 400 in more detail and in accordance with some embodiments.

FIG. 5 is a message flow diagram 500 illustrating the method 400 in more detail and in accordance with some embodiments. The message flow diagram 500 is described herein in terms of the first communication device 110 (UE E), the second communication device 115 (UE B), the third communication device 120 (UE A), the call controller 125, the audio controller 325, audio distributor 330 (audio distributor), and the audio mixer 335. In the illustrated embodiment, the audio controller 325 includes an audio distributor 330 and an audio mixer 335 and is separate from the call controller 125.

At step 505, the second communication device 115 transmits a request to talk to the communication devices in the talk group (in the illustrated embodiment, communication devices 110, 115, and 120) to the call controller 125. At step 510, the call controller 125 grants the PTT floor to the second communication device 115 and transmits a talk grant message to the communication devices 110, 115, and 120 (in other words, to the communication devices to be included in the group call). At step 515, the second communication device 115 transmits the audio signal to the audio controller 325 (specifically, the audio distributor 330). At step 520, the audio controller 325 (audio distributor 330) distributes the received audio to each of the other communication devices 110 and 120. At step 525, the first communication device 110 transmits a soft preemption talk request to the call controller 125. In the illustrated example, the soft preemption talk request includes a flag indicating that the request is for soft preemption (as opposed to a hard preemption).

At step 530, the call controller 125 initiates a full-duplex private call between the talker (second communication device 115) and the soft-preemptor (first communication device 110). The call controller 125 transmits the audio of the full-duplex private call to the talk group of steps 505-520 (in the illustrated embodiment, the third communication device 120) by granting the PTT floor to a false or dummy call taker (step 535). In some embodiments, the dummy call taker is the audio of the full-duplex private call. In other words, the PTT floor is granted to the audio of the full-duplex private call as a half-duplex call. At step 535, the call controller 125 transmits a talk grant message to the communication devices 110, 115, and 120.

During the full-duplex private call, the audio controller 325 receives audio from both the first communication device 110 and the second communication device 115 (step 540). In the illustrated embodiment, the audio controller 325 receives and processes, via the audio mixer 335, the audio from the first communication device 110 and the second communication device 115, combining the audio from both the first communication device 110 and the second communication device 115 (step 545). The audio controller 325 (in particular, the audio distributor 330) then distributes the combined audio of the full-duplex private call to the communication devices 110, 115, and 120. In the illustrated embodiment, the audio distributor 330 distributes, at step 550, the audio to the first communication device 110 and the second communication device 115 as a full-duplex private call and distributes, at step 555, the combined audio from the audio mixer 335 to the third communication device 120 as a half-duplex call (as described above).

At step 560, the call controller 125 ends the full-duplex private call. In the illustrated embodiment, the call controller 125 ends the call when the call controller 125 does not receive audio from either communication device 110 and 115 after a predetermined amount of time. In some embodiments, as mentioned above, the call controller 125 ends the full-duplex private call in response to receiving, from either the first communication device 110 or the second communication device 115, an end private call request. The end private call request may be transmitted by either communication device 110 or 115 in response to receiving a particular user input (for example, a particular actuation pattern of the PTT mechanism, actuation of a custom button or switch, or the like).

The call controller 125, upon ending the full-duplex private call between the first communication device 110 and the second communication device 115, returns the first communication device 110 and the second communication device 115 to the half-duplex group call (step 565). In some embodiments, the call controller 125 is configured to automatically grant the PTT group call floor to a particular communication device based on the received audio from full-duplex private call. For example, as illustrated in FIG. 5, at step 570 the call controller 125, upon returning the first and second communication devices 110 and 115 to the half-duplex call, may automatically grant the PTT floor to the first communication device 110 because the call controller 125 last detected voice in the audio (in other words, the user of the device spoke in the call) from the first communication device 110. In some embodiments, the PTT floor is granted to the communication device 110 or 115 based on which device originally transmitted the request to the call controller 125 to end the private call. For example, as mentioned above, the PTT floor may be granted to the communication device 110 or 115 that did not transmit an end call request.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 20%, in another embodiment within 10%, in another embodiment within 2% and in another embodiment within 1%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A radio communications system comprising:
   a call controller configured to be communicatively coupled to a first communication device, a second communication device and a third communication device, the call controller including an electronic processor configured to
     establish a half-duplex group call between the first communication device, the second communication device, and the third communication device;
     receive, from the second communication device, an audio signal;
     receive, from the first communication device, a soft preemption talk request;
     establish, in response to receiving the soft preemption talk request, a full-duplex private call between the first communication device and the second communication device; and
     transmit audio of the full-duplex private call to the third communication device.

2. The system of claim 1, wherein the electronic processor is further configured to end the full-duplex private call and return the first communication device and the second communication device to the half-duplex group call in response to either the first communication device or the second communication device ending the full-duplex private call.

3. The system of claim 1, wherein the first communication device and the second communication device are associated with a priority level.

4. The system of claim 1, wherein the soft preemption talk request includes a set preemption flag.

5. The system of claim 1, wherein transmitting audio of the full-duplex private call to the third communication device includes granting a communication floor of the half-duplex group call to a dummy call taker, and providing the audio of the full-duplex private call as the audio of the half-duplex group call.

6. The system of claim 1, wherein the electronic processor is further configured to return the first communication device and the second communication device to the half-duplex group call in response to either or both of the first communication device or the second communication device ending the full-duplex private call.

7. The system of claim 6, wherein the electronic processor is further configured to grant a communication floor of the half-duplex group call to whichever of the first communication device and the second communication device that did not end the full-duplex private call.

8. The system of claim 1, wherein the electronic processor is further configured to transmit audio of the full-duplex private call to a group of communication devices that includes the third communication device and wherein the group of communication devices is associated with the half-duplex group call.

9. A communication device communicatively coupled to a second communication device and a third communication device, the communication device including an electronic processor configured to:
   receive an audio signal from the second communication device of a half-duplex group call between the communication device, the second communication device, and the third communication device;
   receive, via a user interface, a user input;
   transmit, in response to receiving the user input, a soft preemption talk request; and
   join a full-duplex private call provided by a call controller, with the second communication device, wherein audio of the full-duplex private call is transmitted, via the call controller, to the third communication device.

10. The communication device of claim 9, wherein the electronic processor is further configured to
    transmit, to the call controller, a request to end the private call; and
    return to the half-duplex group call.

11. The communication device of claim 9, wherein the communication device and the second communication device are associated with a priority level.

12. The communication device of claim 9, wherein the soft preemption talk request includes a set preemption flag.

13. The communication device of claim 9, wherein audio of the full-duplex private call is transmitted to the third communication device via the call controller.

14. The communication device of claim 9, wherein audio of the full-duplex private call is transmitted, via the call controller, to a group of communication devices that includes the third communication device and wherein the group of communication devices is associated with the half-duplex group call.

15. A method of managing a radio communication group call, the method comprising:
    establishing a half-duplex group call between a first communication device, a second communication device, and a third communication device;
    receiving, from the second communication device, an audio signal;
    receiving, from the first communication device, a soft preemption talk request;

establishing, in response to receiving the soft preemption talk request, a full-duplex private call between the first communication device and the second communication device; and transmitting audio of the full-duplex private call to the third communication device.

16. The method of claim 15 further comprising ending the full-duplex private call and returning the first communication device and the second communication device to the half-duplex group call in response to either the first communication device or the second communication device ending the full-duplex private call.

17. The method of claim 15 further comprising transmitting audio of the full-duplex private call to a group of communication devices that includes the third communication device and wherein the group of communication devices is associated with the half-duplex group call.

18. The method of claim 15, wherein the first communication device and the second communication device are associated with a priority level.

19. The method of claim 15, wherein the soft preemption talk request includes a set preemption flag.

20. The method of claim 15, wherein transmitting audio of the full-duplex private call to the third communication device includes granting a communication floor of the half-duplex group call to a dummy call taker, and providing the audio of the full-duplex private call as the audio of the half-duplex group call.

* * * * *